(12) United States Patent
Weksler et al.

(10) Patent No.: US 9,098,196 B2
(45) Date of Patent: Aug. 4, 2015

(54) TOUCH SYSTEM INADVERTENT INPUT ELIMINATION

(75) Inventors: Arnold S. Weksler, Raleigh, NC (US); Russell Speight VanBlon, Raleigh, NC (US); Nathan J. Peterson, Durham, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 196 days.

(21) Appl. No.: 13/493,742

(22) Filed: Jun. 11, 2012

(65) Prior Publication Data

US 2013/0328791 A1   Dec. 12, 2013

(51) Int. Cl.
*G06F 3/041*   (2006.01)
*G06F 3/0488*   (2013.01)

(52) U.S. Cl.
CPC .................................. *G06F 3/04886* (2013.01)

(58) Field of Classification Search
CPC ........ G06F 3/041; G06F 3/0416; G08C 21/00
USPC ....................................... 345/173; 178/18.01
See application file for complete search history.

(56) References Cited

U.S. PATENT DOCUMENTS

| | | | |
|---|---|---|---|
| 8,456,433 B2* | 6/2013 | Chen | 345/173 |
| 8,884,872 B2* | 11/2014 | Kushler | 345/156 |
| 2009/0228901 A1* | 9/2009 | Beaver et al. | 719/318 |
| 2009/0303187 A1* | 12/2009 | Pallakoff | 345/169 |
| 2009/0309768 A1 | 12/2009 | Pihlaja | |
| 2010/0073303 A1* | 3/2010 | Wu et al. | 345/173 |
| 2010/0194702 A1* | 8/2010 | Chen | 345/173 |
| 2012/0081277 A1* | 4/2012 | de Paz | 345/156 |
| 2013/0044070 A1* | 2/2013 | Townsend et al. | 345/173 |
| 2013/0076650 A1* | 3/2013 | Vik et al. | 345/173 |
| 2013/0265269 A1* | 10/2013 | Sharma et al. | 345/173 |

* cited by examiner

*Primary Examiner* — Dwayne Bost
*Assistant Examiner* — Chineyere Wills-Burns
(74) *Attorney, Agent, or Firm* — Ference & Associates LLC (57) ABSTRACT

In one aspect a method is provided that includes: detecting touch input at a first touch point on a touch screen; detecting touch input at a second touch point on the touch screen within a predetermined time of detecting said touch input at the first touch point, the second touch point being within a predefined proximity to the first touch point; and performing an action to eliminate touch input detected at the second touch point on the touch screen. Other aspects are described.

20 Claims, 5 Drawing Sheets

TOUCH SYSTEM INADVERTENT INPUT ELIMINATION

BACKGROUND

As data is entered using a touch sensitive device (hereinafter "touch screen"), keys may be entered by mistake as the finger is being moved from one key to another. The finger scrapes the screen gently as the finger is being moved from one part of the touch screen to another and causes erroneous keys to be entered into the data fields.

BRIEF SUMMARY

In summary, one aspect provides a method comprising: detecting touch input at a first touch point on a touch screen; detecting touch input at a second touch point on the touch screen within a predetermined time of detecting said touch input at the first touch point, the second touch point being within a predefined proximity to the first touch point; and performing an action to eliminate the touch input detected at the second touch point on the touch screen.

Another aspect provides a system, comprising: one or more processors; a memory in communication with the one or more processors; and a touch screen; the memory storing program instructions that when executed by the one or more processors: detect touch input at a first touch point on a touch screen; detect touch input at a second touch point on the touch screen within a predetermined time of detecting said touch input at the first touch point, the second touch point being within a predefined proximity to the first touch point; and perform an action to eliminate the touch input detected at the second touch point on the touch screen.

A further aspect provides a program product, comprising: a storage medium having program code embodied therewith, the program code comprising: program code configured to detect touch input at a first touch point on a touch screen; program code configured to detect touch input at a second touch point on the touch screen within a predetermined time of detecting said touch input at the first touch point, the second touch point being within a predefined proximity to the first touch point; and program code configured to perform an action to eliminate the touch input detected at the second touch point on the touch screen.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

It will be readily understood that the components of the embodiments, as generally described and illustrated in the figures herein, may be arranged and designed in a wide variety of different configurations in addition to the described example embodiments. Thus the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

In operating a touch screen, users often inadvertently supply touch input which registers on the touch screen as if it were valid, intentional input. Currently, a user must recognize this and use additional input, for example entering a backspace key, to remedy the erroneous data thus entered. Alternatively, complex algorithms have been designed that guess if an input was inadvertent, for example via use of spell checking and word prediction algorithms.

For example, a user attempting to enter a word with a first letter on one side of a key board may correctly provide input to a touch point on the touch screen associated with the correct letter's soft key, but then inadvertently drag or scrape a finger (or stylus, et cetera) across an adjacent touch point or a touch point located within a predefined proximity (hereinafter simply "adjacent"), such as associated with immediately adjacent or nearby letters to the first letter. Such inadvertent input is often the result of a user providing input to the first letter touch point correctly, then not fully removing the finger from the touch screen prior to moving into another, adjacent touch point associated with an adjacent soft key on the way to the intended soft key (for example, located on the other side of the keyboard).

Embodiments provide for inadvertent input elimination via a variety of mechanisms. An embodiment provides for inadvertent input elimination by detecting inadvertent input and automatically undoing it prior to it registering as valid input, for example, via filtering out the input deemed to be inadvertent. Another embodiment provides for inadvertent input elimination by detecting inadvertent input and allowing a user a convenient mechanism for undoing the inadvertent input. Various embodiments detect inadvertent input via pattern detection techniques that are not reliant on complex spell checking or word prediction algorithms, as further described herein.

The illustrated example embodiments will be best understood by reference to the figures. The following description is intended only by way of example, and simply illustrates certain example embodiments.

Figure 1:
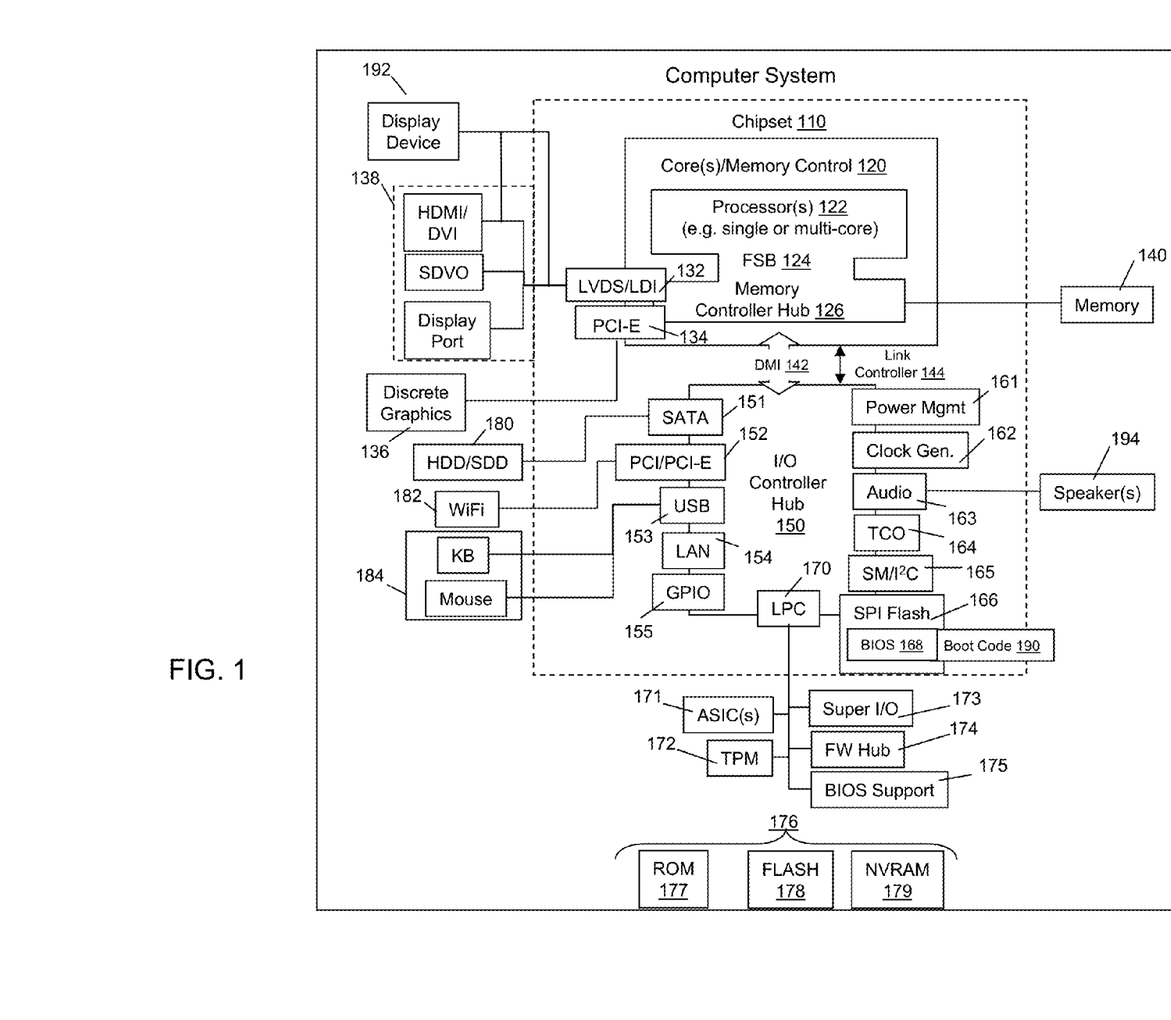
FIG. 1 illustrates an example information handling device.

While various other circuits, circuitry or components may be utilized, FIG. 1 depicts a block diagram of one example of information handling device circuits, circuitry or components. The example depicted in FIG. 1 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 1.

The example of FIG. 1 includes a so-called chipset 110 (a group of integrated circuits, or chips, that work together, chipsets) with an architecture that may vary depending on manufacturer (for example, INTEL, AMD, ARM, etc.). The architecture of the chipset 110 includes a core and memory control group 120 and an I/O controller hub 150 that exchanges information (for example, data, signals, commands, et cetera) via a direct management interface (DMI) 142 or a link controller 144. In FIG. 1, the DMI 142 is a chip-to-chip interface (sometimes referred to as being a link between a "northbridge" and a "southbridge"). The core and memory control group 120 include one or more processors 122 (for example, single or multi-core) and a memory controller hub 126 that exchange information via a front side bus (FSB) 124; noting that components of the group 120 may be integrated in a chip that supplants the conventional "northbridge" style architecture.

In FIG. 1, the memory controller hub 126 interfaces with memory 140 (for example, to provide support for a type of RAM that may be referred to as "system memory" or "memory"). The memory controller hub 126 further includes a LVDS interface 132 for a display device 192 (for example, a CRT, a flat panel, touch screen, et cetera). A block 138 includes some technologies that may be supported via the LVDS interface 132 (for example, serial digital video, HDMI/DVI, display port). The memory controller hub 126 also includes a PCI-express interface (PCI-E) 134 that may support discrete graphics 136.

In FIG. 1, the I/O hub controller 150 includes a SATA interface 151 (for example, for HDDs, SDDs, 180 et cetera), a PCI-E interface 152 (for example, for wireless connections 182), a USB interface 153 (for example, for devices 184 such as a digitizer, keyboard, mice, cameras, phones, storage, other connected devices, et cetera), a network interface 154 (for example, LAN), a GPIO interface 155, a LPC interface 170 (for ASICs 171, a TPM 172, a super I/O 173, a firmware hub 174, BIOS support 175 as well as various types of memory 176 such as ROM 177, Flash 178, and NVRAM 179), a power management interface 161, a clock generator interface 162, an audio interface 163 (for example, for speakers 194), a TCO interface 164, a system management bus interface 165, and SPI Flash 166, which can include BIOS 168 and boot code 190. The I/O hub controller 150 may include gigabit Ethernet support.

The system, upon power on, may be configured to execute boot code 190 for the BIOS 168, as stored within the SPI Flash 166, and thereafter processes data under the control of one or more operating systems and application software (for example, stored in system memory 140). An operating system may be stored in any of a variety of locations and accessed, for example, according to instructions of the BIOS 168. As described herein, a device may include fewer or more features than shown in the system of FIG. 1.

Figure 2:
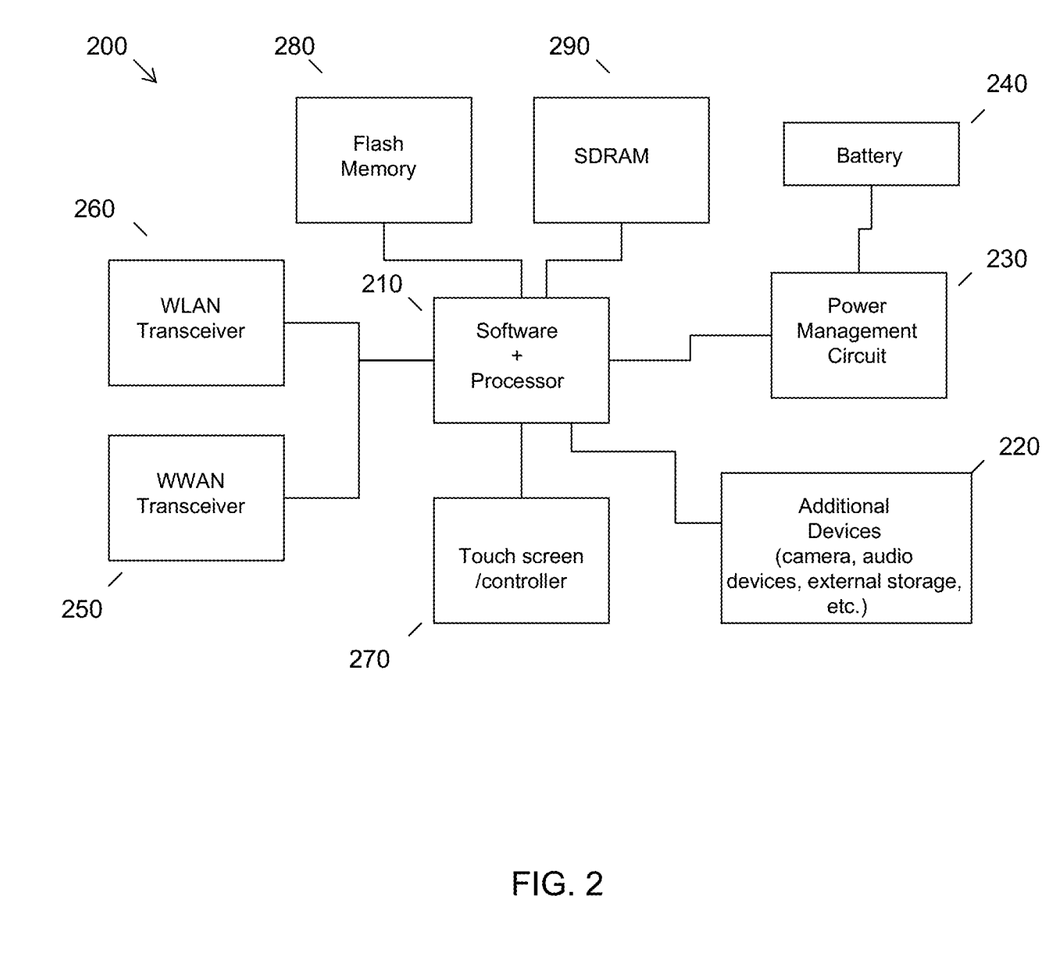
FIG. 2 illustrates another information handling device.

For example, referring to FIG. 2, with regard to smart phone and/or tablet circuitry 200, an example includes an ARM based system (system on a chip) design, with software and processor(s) combined in a single chip 210. Internal busses and the like depend on different vendors, but essentially all the peripheral devices (220) may attach to a single chip 210. In contrast to the circuitry illustrated in FIG. 1, the tablet circuitry 200 combines the processor, memory control, and I/O controller hub all into a single chip 210. Also, ARM based systems 200 do not typically use SATA or PCI or LPC. Common interfaces for example include SDIO and I2C. There are power management chip(s) 230, which manage power as supplied for example via a rechargeable battery 240, which may be recharged by a connection to a power source (not shown), and in at least one design, a single chip, such as 210, is used to supply BIOS like functionality and DRAM memory.

ARM based systems 200 typically include one or more of a WWAN transceiver 250 and a WLAN transceiver 260 for connecting to various networks, such as telecommunications networks and wireless base stations. Commonly, an ARM based system 200 will include a touch screen 270 for data input and display. ARM based systems 200 also typically include various memory devices, for example flash memory 280 and SDRAM 290.

Figure 3:
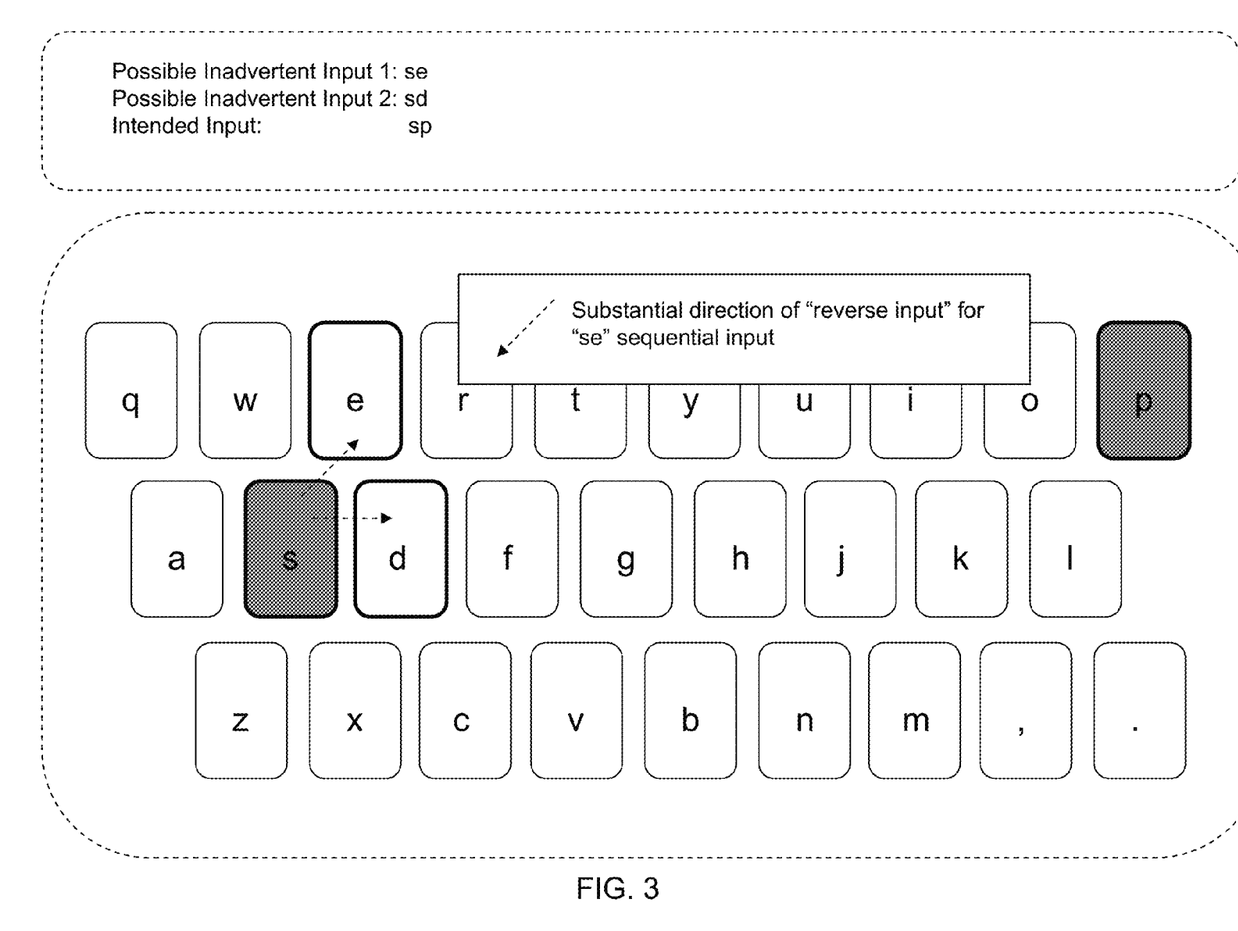
FIG. 3 illustrates an example portion of a touch screen keyboard and inadvertent input.

Referring to FIG. 3, in operating a touch screen, users often inadvertently supply touch input which registers on the touch screen as if valid, intentional input. For example, a user attempting to enter the word "spot" may correctly provide input to a touch point on the touch screen associated with the "s" soft key, but then inadvertently drag or scrape a finger (or stylus, et cetera) across (or otherwise interface with) an immediately adjacent touch point, such as associated with the letters "e" or "d" (again, "adjacent" is simply one example and used as a shorthand reference to within a predefined proximity). Such inadvertent input is often the result of a user providing input to the "s" touch point, then not fully removing the finger from the keyboard prior to moving into another, adjacent touch point associated with an adjacent soft key on the way to the intended soft key. This problem is particularly noticeable in smaller touch screens, such as implemented on many smart phones, where touch points/zones defining adjacent keys are closely spaced.

As can be appreciated from the above non-limiting example, the possible inputs may thus be "se" or "sd" (or even "sf" or "sg" as these are within a predetermined proximity), whereas the intended input was actually "s" to be followed by "p". Conventional approaches are not suitable for handling this problem. For example, a spell checker (or other like prediction algorithm) may detect "sd" as inadvertent input, as this is an unusual letter combination (in the English language). Nonetheless, "se" may not likewise be detectable, as many words (in the English language) utilize this combination. Accordingly, conventional prediction-based solutions would not properly detect the "se" combination as inadvertent input, although it may well be. Numerous other examples are readily understandable but omitted for the sake of brevity.

Accordingly, an embodiment provides for detecting inadvertent input to a touch screen. An embodiment employs pattern detection to quickly ascertain inadvertent touch screen input. An embodiment deems input as inadvertent if input is detected at two adjacent touch points on the touch screen associated with two adjacent soft keys within a predetermined time. The predetermined time may be modified, but should be indicative of inadvertent input. For example, the predetermined time may be set extremely quickly (less than 0.1 second) such that the inadvertent input must be substantially simultaneously input with the first input. Such a short predetermined time period is indicative of an inadvertent input via scraping or hitting areas associated with two adjacent soft keys.

Figure 4:
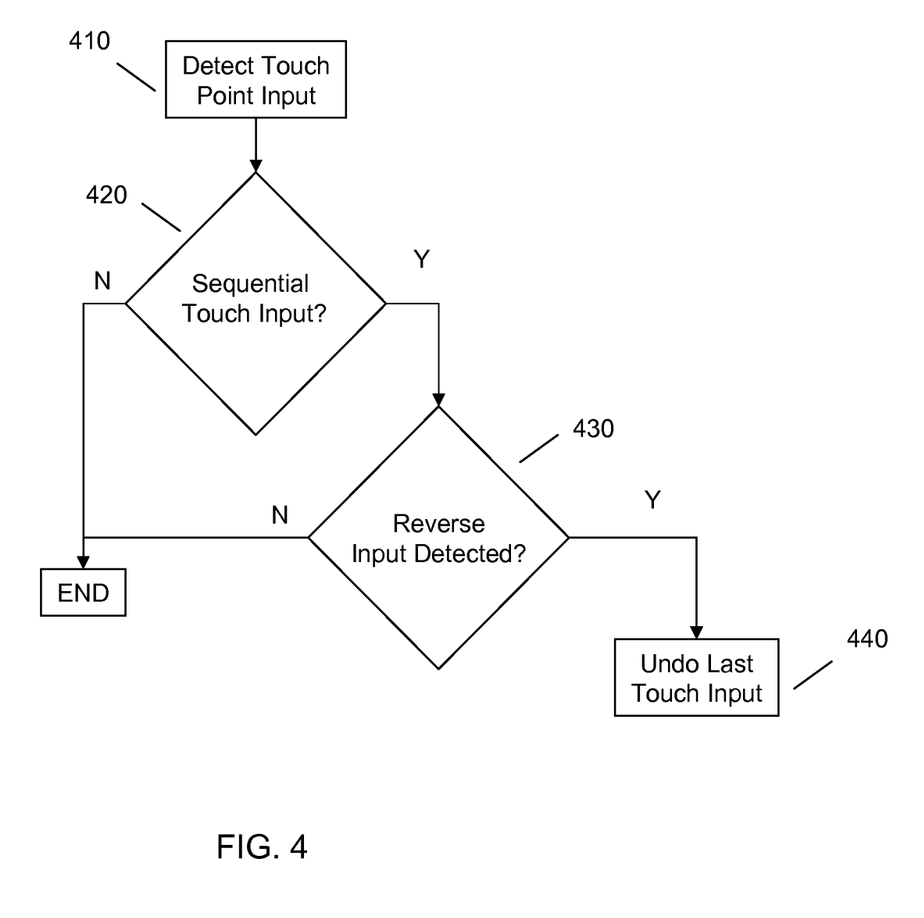
FIG. 4 illustrates an example method for eliminating inadvertent input.

In FIG. 4 an example method for eliminating inadvertent input is illustrated. Here, an embodiment detects touch input. The touch input is monitored to determine if the touch input is sequential 420, that is, if it occurs within the predetermined time and is from adjacent touch points associated with adjacent soft keys. If not, the embodiment does not detect inadvertent input and takes no further action.

If the touch input is sequential, that is, it occurs within a predetermined time and is from adjacent touch points associated with adjacent soft keys, an embodiment allows the touch input to be registered, but also provides a mechanism for undoing or eliminating the touch input. Thus, the second input is detected as inadvertent input, but is permitted to be registered, for example as displayed on the touch screen (for example, in a preview box or included in an actual display such as a text box of a web page). However, an embodiment then activates an additional functionality that permits determination if reverse input is detected 430.

Reverse input is input that permits elimination of the input that may be inadvertent. Reverse input is defined herein as substantially the opposite of the initially provided input. For example, if the inadvertent input resulted from a scrape from left to right, then reverse input would include a scrape from right to left. Similarly, if a scrape input from up to down provided in the inadvertent input (sequential input), then a scrape from down to up provides a reverse input. If a reverse input is detected 440, the last input is undone or eliminated, for example via deletion of the second of the sequential inputs.

As a non-limiting example, referring back to FIG. 3, if a user intends to enter the word "spot" and first provides an input to a touch point associated with the "s" soft key of a touch screen, then almost immediately provides an input to a touch point associated with the "e" soft key of the touch screen, an embodiment will detect this as sequential input on the basis that the touch points are in close proximity, associated with adjacent soft keys, and provided within a short time period. In this case, an embodiment may then provide an additional functionality whereby a user may provide reverse input to reverse any inadvertent input.

For example, an embodiment will detect an input of any downward/left to right scrape or swipe input as an undo or reverse (elimination request) of the initial sequential key input of "s" and "e". Embodiments may provide that the reverse input be substantially the opposite of the initial sequential input within a predetermined tolerance. For example, the predetermined tolerance may be an exactly opposite input (exact reverse), or a substantial reverse, for example a scrape or swipe in substantially the opposite direction of a vector direction of the initial sequential inputs in question. A user may be provided with a settings menu for modifying this tolerance.

Figure 5:
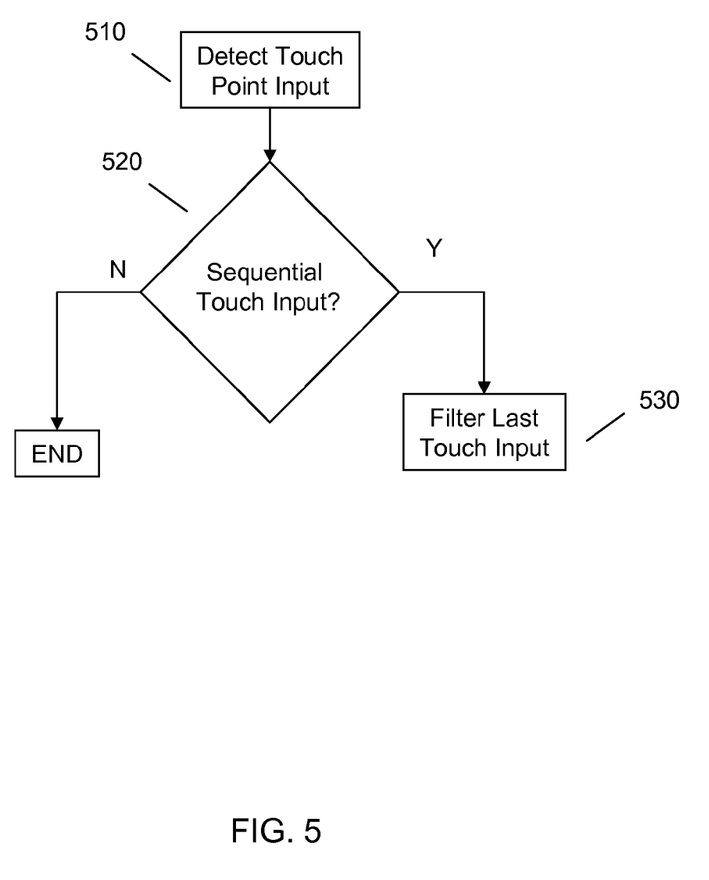
FIG. 5 illustrates an example method for eliminating inadvertent input.

Referring to FIG. 5, an example method for eliminating inadvertent input is illustrated. Again, touch input is detected at the touch screen 510. If sequential input is detected 520, that is inputs to two adjacent touch points associated with two adjacent soft keys within a predetermined time, an embodiment may automatically filter (undo, eliminate) the inadvertent touch input. For example, if sequential touch inputs are detected, an embodiment may prevent the second input from even registering (for example, in a preview box or included in an actual display such as a text box of a web page). Accordingly, an embodiment may automatically filter the inadvertent input without requiring the user to provide any additional input, such as reverse input.

As a non-limiting example, if a user intends to enter the word "spot" and first provides an input to a touch point associated with the "s" soft key of a touch screen, then almost immediately provides an input to a touch point associated with the "e" soft key of the touch screen, an embodiment will detect this as sequential input on the basis that the touch points are in close proximity, associated with adjacent soft keys, and provided within a short time period. Accordingly, an embodiment may automatically filter the "e" soft key input and not permit it to register (for example, in a preview box or included in an actual display such as a text box of a web page).

It is apparent from the above description at least one embodiment provides a simple mechanism for detecting inadvertent input that is more accurate than complicated spell check or pattern learning/prediction techniques in certain circumstances. For example, an embodiment detects sequential inputs on the basis of straightforward timing and spacing requirements and either automatically filters out the input or activates an additional feature allowing reverse input to eliminate or undo the inadvertent input.

Embodiments may be implemented in one or more information handling devices configured appropriately to execute program instructions consistent with the functionality of the embodiments as described herein. In this regard, FIG. 1 and FIG. 2 illustrate non-limiting examples of such devices and components thereof. While mobile computing systems such as tablet computers, laptop computers, and smart phones have been specifically mentioned as examples herein, embodiments may be implemented using other systems or devices, such as e-readers, navigation systems, kiosks, and the like.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied thereon.

Any combination of one or more non-signal device readable medium(s) may be utilized. The non-signal medium may be a storage medium. A storage medium may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider) or through a hard wire connection, such as over a USB connection.

Aspects are described herein with reference to the figures, which illustrate example methods, devices and program products according to various example embodiments. It will be understood that the actions and functionality illustrated may be implemented at least in part by program instructions. These program instructions may be provided to a processor of a general purpose information handling device, a special purpose information handling device, or other programmable data processing device or information handling device to produce a machine, such that the instructions, which execute via a processor of the device implement the functions/acts specified.

The program instructions may also be stored in a device readable medium that can direct a device to function in a particular manner, such that the instructions stored in the device readable medium produce an article of manufacture including instructions which implement the function/act specified.

The program instructions may also be loaded onto a device to cause a series of operational steps to be performed on the device to produce a device implemented process such that the instructions which execute on the device provide processes for implementing the functions/acts specified.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method comprising:
   detecting touch data input at a first touch point on a touch screen;
   detecting sequential touch data input at a second touch point on the touch screen within a predetermined time of detecting said touch data input at the first touch point, the second touch point being within a predefined proximity to the first touch point; and
   performing an action to eliminate the touch data input detected at the second touch point on the touch screen.

2. The method of claim 1, wherein the action to eliminate the touch data input detected at the second touch point on the touch screen comprises filtering the touch data input detected at the second touch point on the touch screen such that the touch data input detected at the second touch point on the touch screen is not registered.

3. The method of claim 1, wherein the action to eliminate the touch data input detected at the second touch point on the touch screen comprises:
   detecting touch input which is a reverse of a sequence of input represented by the touch data input at the first touch point and the touch data input at the second touch point; and
   undoing a result of the touch data input at the second touch point.

4. The method of claim 1, wherein the action to eliminate the touch data input detected at the second touch point on the touch screen comprises:
   in response to detecting the touch data input at the first touch point and detecting the touch data input at the second touch point on the touch screen within a predetermined time, activating a program module that:
   detects touch input which is a reverse of a sequence of input represented by the touch data input at the first touch point and the touch data input at the second touch point; and
   undoes a result of the touch data input at the second touch point.

5. The method of claim 1, wherein the first touch point and the second touch point are associated with adjacent soft keys on the touch screen.

6. The method of claim 1, wherein the predetermined time is less than 0.1 seconds.

7. The method of claim 1, wherein the touch screen comprises a touch screen implemented on a smart phone.

8. The method of claim 1, wherein the touch screen comprises a touch screen implemented on tablet computing device.

9. The method of claim 1, wherein the predetermined time is less than 1 second.

10. A system, comprising:
    one or more processors;
    a memory in communication with the one or more processors; and
    a touch screen;
    the memory storing program instructions that when executed by the one or more processors:
    detect touch data input at a first touch point on a touch screen;
    detect sequential touch data input at a second touch point on the touch screen within a predetermined time of detecting said touch data input at the first touch point, the second touch point being within a predefined proximity to the first touch point; and
    perform an action to eliminate the touch data input detected at the second touch point on the touch screen.

11. The system of claim 10, wherein the action to eliminate the touch data input detected at the second touch point on the touch screen comprises filtering the touch data input detected at the second touch point on the touch screen such that the touch data input detected at the second touch point on the touch screen is not registered.

12. The system of claim 10, wherein the action to eliminate the touch data input detected at the second touch point on the touch screen comprises:
    detecting touch input which is a reverse of a sequence of input represented by the touch data input at the first touch point and the touch data input at the second touch point; and
    undoing a result of the touch data input at the second touch point.

13. The system of claim 10, wherein the action to eliminate the touch data input detected at the second touch point on the touch screen comprises:
    in response to detecting the touch data input at the first touch point and detecting the touch data input at the second touch point on the touch screen within a predetermined time, activating a program module that:
    detects touch input which is a reverse of a sequence of input represented by the touch data input at the first touch point and the touch data input at the second touch point; and
    undoes a result of the touch data input at the second touch point.

14. The system of claim 10, wherein the first touch point and the second touch point are associated with adjacent soft keys on the touch screen.

15. The system of claim 10, wherein the predetermined time is less than 0.1 seconds.

16. The system of claim 10, wherein the system is a smart phone.

17. The system of claim 10, wherein the system is a tablet computing device.

18. The system of claim 10, wherein the system is a kiosk device.

19. The system of claim 10, wherein the predetermined time is less than 1 second.

20. A program product, comprising:
    a storage medium having program code embodied therewith, the program code executable by the processor and comprising:
    program code that detects touch data input at a first touch point on a touch screen;
    program code that detects sequential touch data input at a second touch point on the touch screen within a predetermined time of detecting said touch data input at the first touch point, the second touch point being within a predefined proximity to the first touch point; and
    program code that perform an action to eliminate touch data input detected at the second touch point on the touch screen.

* * * * *